United States Patent
Wei

(10) Patent No.: US 11,679,441 B2
(45) Date of Patent: Jun. 20, 2023

(54) DRILLING MACHINE AND LASER ALIGNMENT SYSTEM THEREOF

(71) Applicant: MINCHUEN ELECTRICAL MACHINERY CO., LTD, Taichung (TW)

(72) Inventor: Ta Chuang Wei, Taichung (TW)

(73) Assignee: MINCHUEN ELECTRICAL MACHINERY CO., LTD, Taichung (TW)

( * ) Notice: Subject to any disclaimer, the term of this patent is extended or adjusted under 35 U.S.C. 154(b) by 1058 days.

(21) Appl. No.: 16/423,683

(22) Filed: May 28, 2019

(65) Prior Publication Data

US 2020/0376569 A1 Dec. 3, 2020

(51) Int. Cl.
*B23B 49/00* (2006.01)
*B23Q 17/22* (2006.01)
*B23Q 17/24* (2006.01)

(52) U.S. Cl.
CPC .......... *B23B 49/00* (2013.01); *B23Q 17/2233* (2013.01); *B23Q 17/2414* (2013.01); *B23B 2260/004* (2013.01); *B23B 2260/092* (2013.01); *B23B 2260/124* (2013.01); *B23B 2260/136* (2013.01)

(58) Field of Classification Search
CPC .............. B23B 49/00; B23B 2260/004; B23B 2260/092; B23B 2260/124; B23B 2260/136; B23Q 17/2419; B23Q 17/2266; B23Q 17/22; B23Q 17/2233; B23Q 17/2414; G01C 15/004; G01C 1/02

USPC .......... 33/286, 638, 639, 642, 628, 290, 299
See application file for complete search history.

(56) References Cited

U.S. PATENT DOCUMENTS

| | | | |
|---|---|---|---|
| 6,937,336 B2* | 8/2005 | Garcia | B23Q 17/2233 356/147 |
| 7,200,516 B1* | 4/2007 | Cowley | B23B 49/00 356/138 |
| 2004/0136795 A1* | 7/2004 | Chen | B23Q 3/183 408/16 |
| 2004/0136796 A1* | 7/2004 | Chen | B23Q 17/24 408/16 |
| 2006/0188127 A1* | 8/2006 | Reilley | B23Q 17/24 382/100 |

(Continued)

FOREIGN PATENT DOCUMENTS

WO WO-2006119703 A2 * 11/2006 ............ B23B 49/00

*Primary Examiner* — Eric A. Gates
(74) *Attorney, Agent, or Firm* — Muncy, Geissler, Olds & Lowe, P.C.

(57) ABSTRACT

A laser alignment system is affixed to a drilling machine M, the laser alignment system contains: a base, two first fixers, two lamp holders, two second fixers, two first resilient elements, two first adjustable screws, two second resilient elements, and two second adjustable screws. The base includes two symmetrical holding sections, two extensions, and two peripheral orifices. Each first fixer has a first arcuate portion, an accommodation hole, a first threaded hole, a limitation hole, a first protrusion and a second protrusion. Each lamp holder includes a peripheral knob, a first receiving orifice, a first rotation portion, a second rotation portion, and a swing portion. Each second fixer includes a second arcuate portion, a second receiving orifice, a first projection and a second projection.

3 Claims, 9 Drawing Sheets

(56) References Cited

U.S. PATENT DOCUMENTS

2007/0030486 A1* 2/2007 Gelbart .............. B23Q 17/2233
356/399
2011/0318122 A1 12/2011 Montplaisir et al.
2015/0165580 A1* 6/2015 Holland ............. B23Q 17/2275
408/1 BD
2017/0282321 A1* 10/2017 Wixey ................... B23B 49/00

\* cited by examiner

US 11,679,441 B2

DRILLING MACHINE AND LASER ALIGNMENT SYSTEM THEREOF

FIELD OF THE INVENTION

The present invention relates to a laser alignment system which is affixed to a drilling machine so as to reduce manufacture cost.

BACKGROUND OF THE INVENTION

A conventional drilling machine contains a drill head configured to drill a workpiece at a high rotation speed so as to drill a bore. When the drilling machine operates, a drilling position of the drill head is aligned with a desired drilling position of the workpiece with operator's eyes, thus causing an offset of the desired drilling position.

To overcome above-mentioned problem, the operator has to draw a line on the workpiece and to punch a desired bore on the workpiece by using a header punch, and the desired bore is drilled further by ways of the drilling machine. However, such a drilling operation is troublesome.

A laser alignment system for a drill press is disclosed in US US2011/0318122A1 and includes first and second adjustable laser assemblies mountable on the drill press. Each adjustable laser assembly includes a base firmly affixed to the drill press, a rotatable element mounted on the base and being adapted to selectively rotate relative to the base, a pivotable element mounted on the rotatable element and being adapted to selectively pivot relative to the rotatable element, and a laser mounted on the pivotable element and being adapted to move simultaneously with the pivotable element. The laser alignment system includes a pivot adjusting mechanism coupled with the pivotable element for selectively pivoting the pivotable element relative to the rotatable element, and a rotation adjusting mechanism coupled with the rotatable element for selectively rotating the rotatable element relative to the base. Nevertheless, the laser beam cannot be adjusted stably and precisely.

The present invention has arisen to mitigate and/or obviate the afore-described disadvantages.

SUMMARY OF THE INVENTION

The primary objective of the present invention is to provide a laser alignment system which is affixed to a drilling machine so as to reduce manufacture cost.

Another objective of the present invention is to provide a laser alignment system, which contains two first fixers, two lamp holders, and two second fixers, wherein the peripheral knob of each lamp holder is clamped by the second arcuate portion of each second fixer and the first arcuate portion of each first fixer so as to enhance a contacting area of the peripheral knob, the second arcuate portion, and the first arcuate portion, thus adjusting the laser securely.

DETAILED DESCRIPTION OF THE PREFERRED EMBODIMENTS

Figure 1:
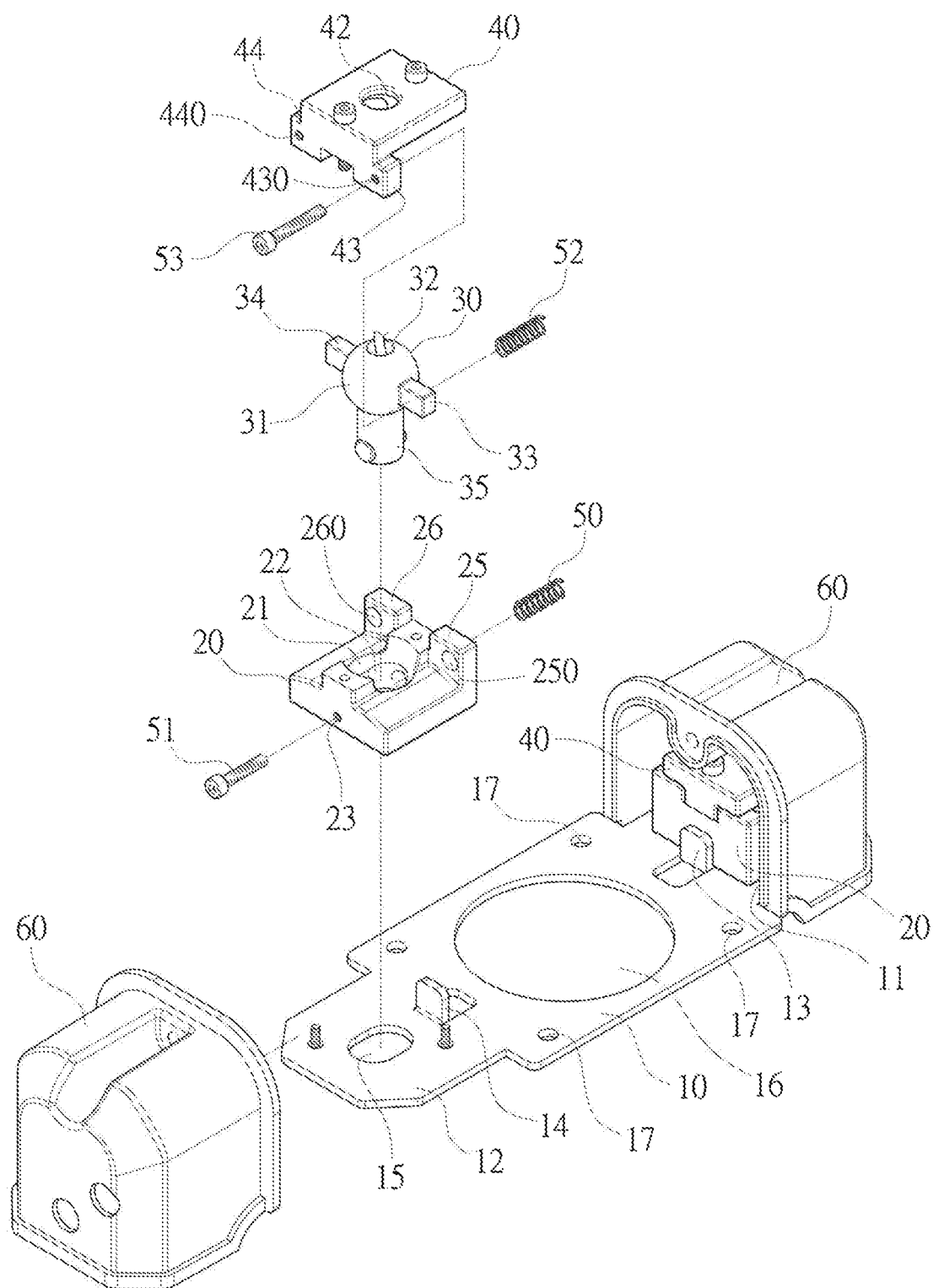
FIG. 1 is a perspective view showing the exploded components of one side of a laser alignment system affixed to a drilling machine according to a preferred embodiment of the present invention.
Figure 2:
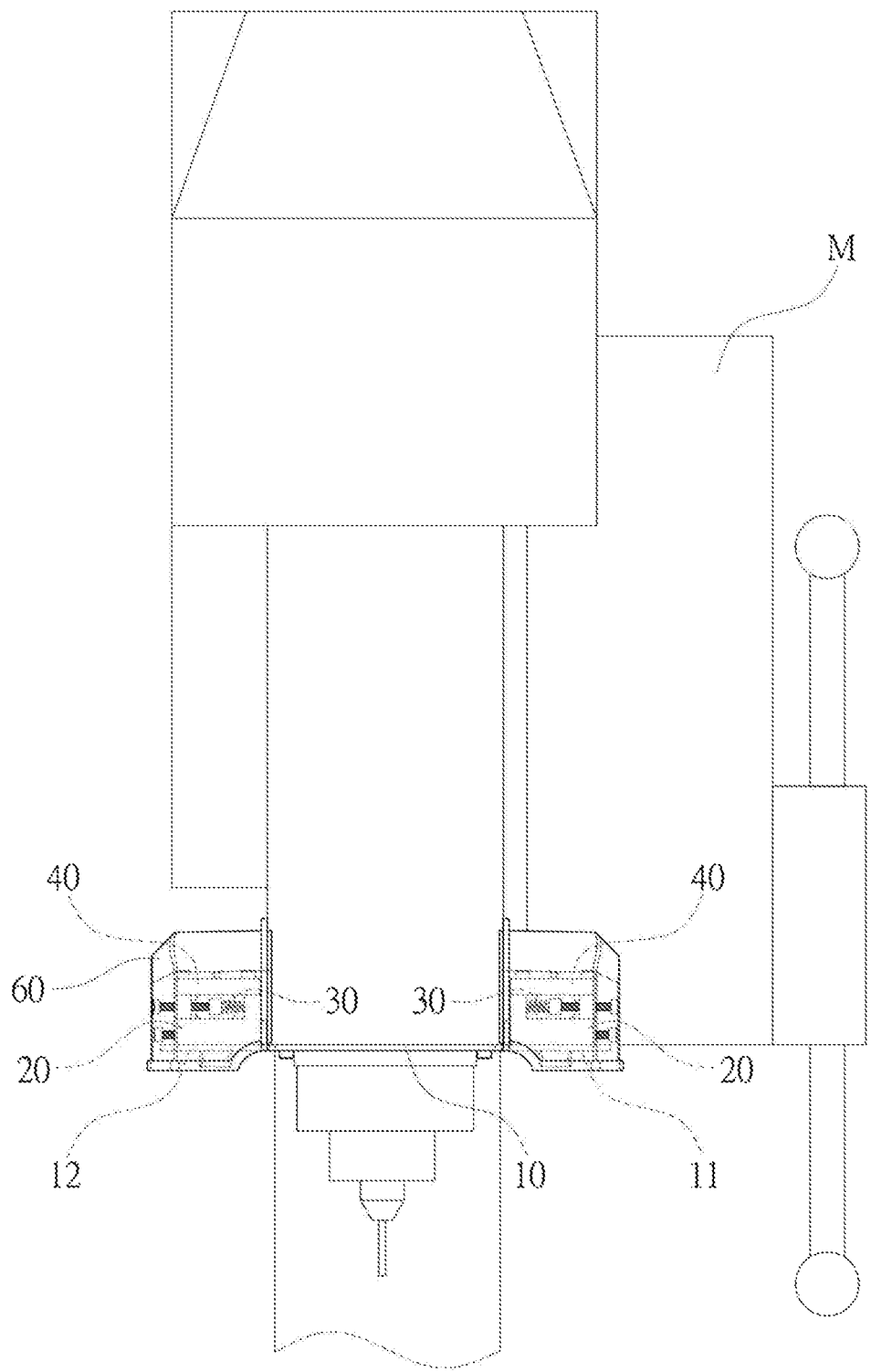
FIG. 2 is a side plan view showing the application of one side of a laser alignment system according to the preferred embodiment of the present invention.
Figure 3:
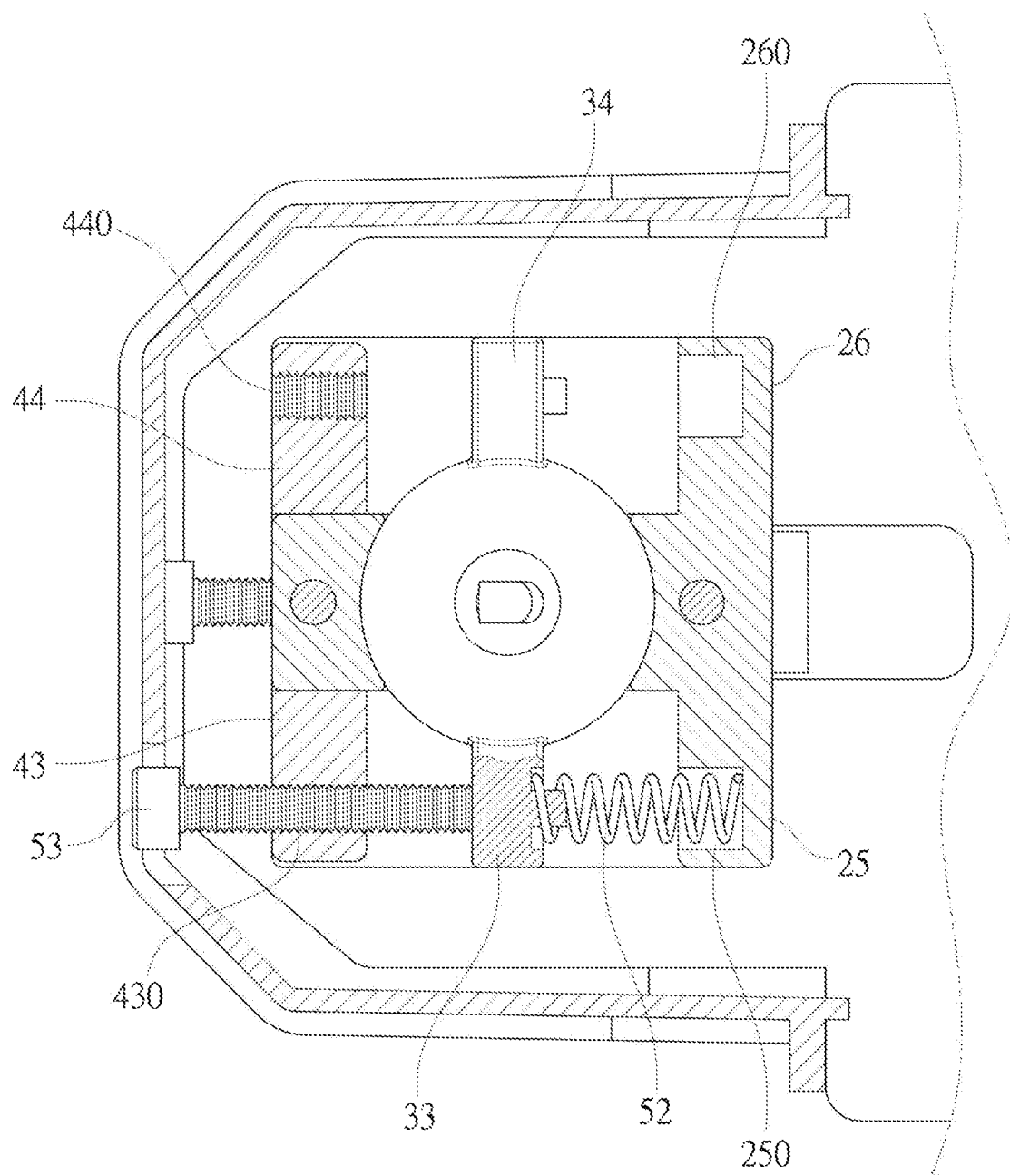
FIG. 3 is a cross sectional view showing the assembly of tone side of a laser alignment system according to the preferred embodiment of the present invention.
Figure 4:
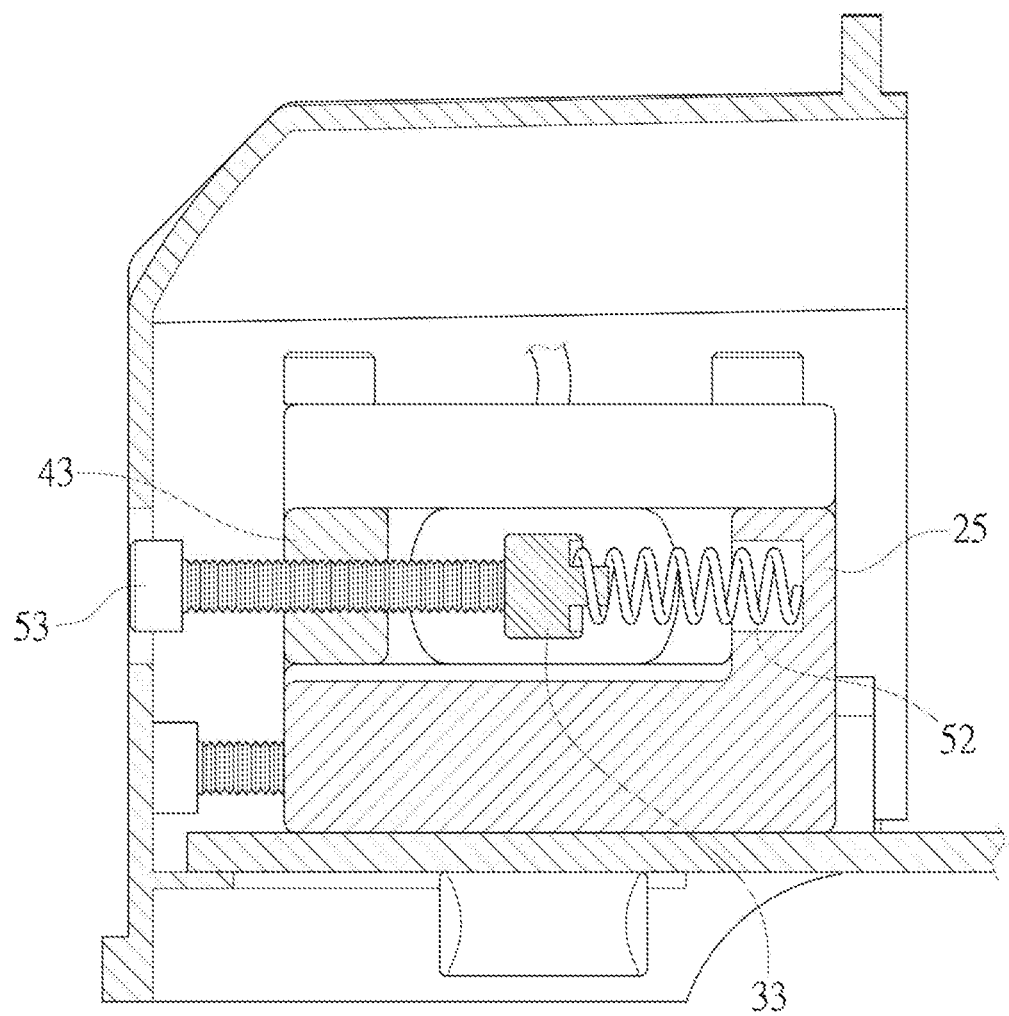
FIG. 4 is another cross sectional view showing the assembly of one side of a laser alignment system according to the preferred embodiment of the present invention.
Figure 5:
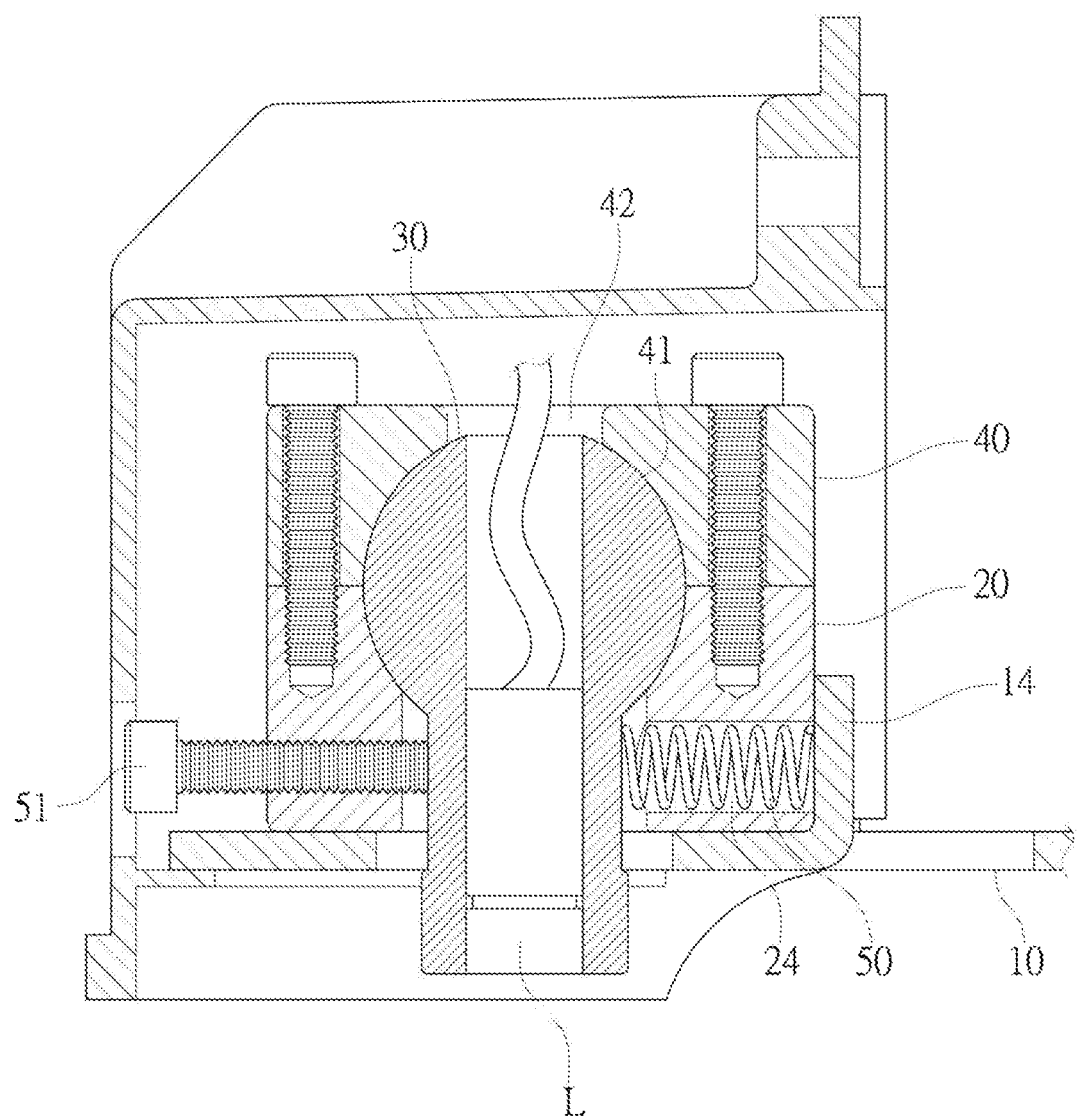
FIG. 5 is also another cross sectional view showing the assembly of the one side of a laser alignment system according to the preferred embodiment of the present invention.
Figure 6:
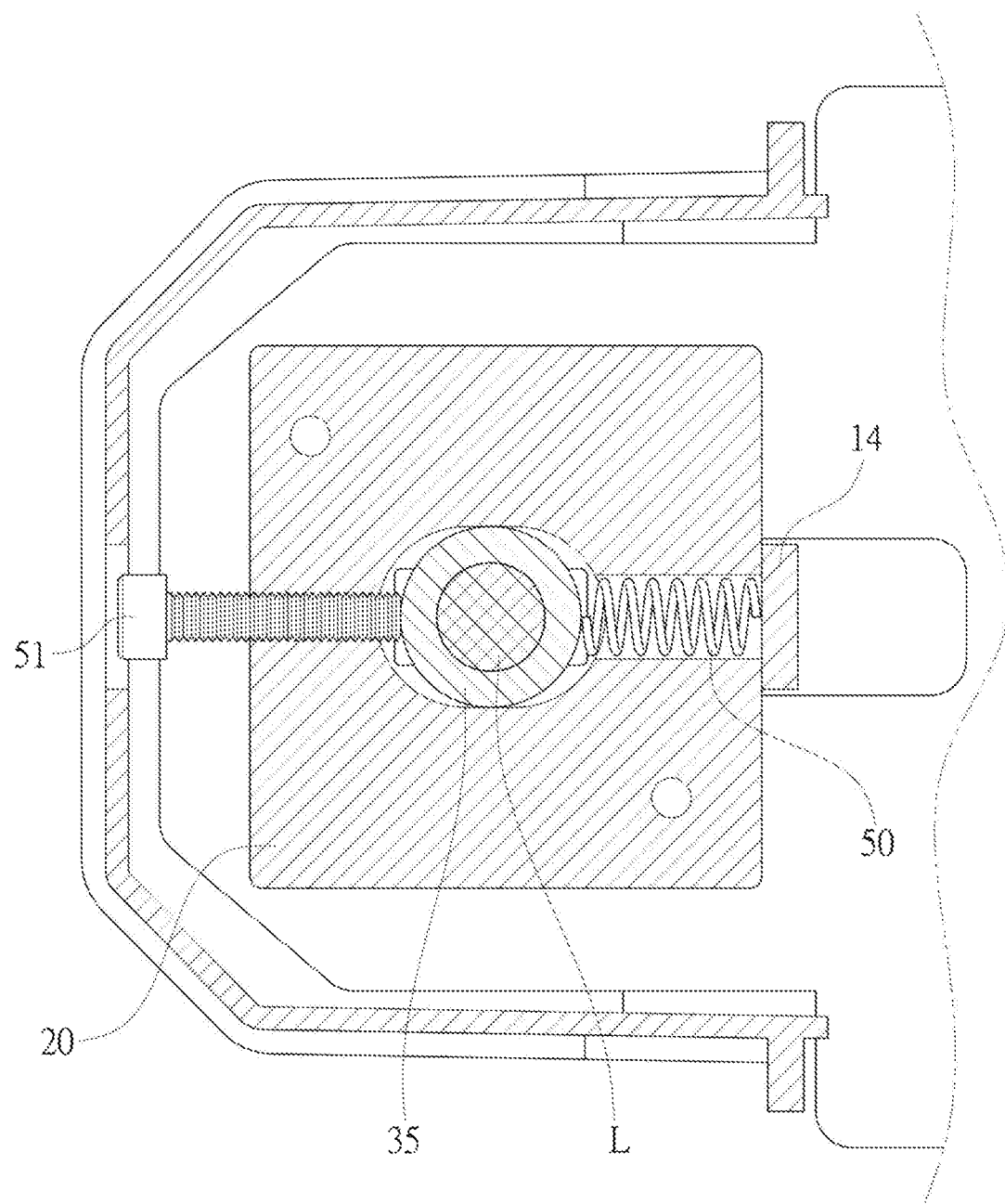
FIG. 6 is still another cross sectional view showing the assembly of one side of a laser alignment system according to the preferred embodiment of the present invention.

With reference to FIGS. 1-6, a laser alignment system is affixed to a drilling machine, the laser alignment system according to a preferred embodiment of the present invention comprises:

a base 10 including two symmetrical holding sections 11, 12 formed on two ends of the base 10 respectively, two extensions 13, 14 extending from the two symmetrical holding sections 11, 12 respectively, two peripheral orifices 15 formed on the two symmetrical holding sections 11, 12 individually, a central orifice 16 defined on a center of the base 10 so as to accommodate a drill head of the drilling machine, and multiple passing orifices 17 surrounding the central orifice 16 and configured to lock the base 10 on the drilling machine M;

two first fixers 20 abutting against the two extensions 13, 14 and locked on the two symmetrical holding sections 11, 12 individually, wherein each of the two first fixers 20 has a first arcuate portion 21, an accommodation hole 22 passing through the first arcuate portion 21 downwardly, a first threaded hole 23 horizontally passing through each first fixer 20, a limitation hole 24 horizontally passing through each first fixer 20, two symmetrical protrusions (i.e., a first protrusion 25 and a second protrusion 26) extending upward from a side of each first fixer 20, wherein the first protrusion 25 has a first notch 250, and the second protrusion 26 has a second notch 260, wherein the two peripheral orifices 15 are in communication with the accommodation hole 22, the first threaded hole 23, and the limitation hole 24;

two lamp holders 30, each of the two lamp holders 30 including a peripheral knob 31, a first receiving orifice 32, a first rotation portion 33, a second rotation portion 34, and a swing portion 35, wherein the second rotation portion 34 is opposite to the first rotation portion 33 so that each lamp holder 30 is formed in a T shape, the swing portion 35 is inserted into the accommodation hole 22, the peripheral knob 31 is mounted on the first arcuate portion 21, and the swing portion 35 is hollow and is in communication with the first receiving orifice 32 so as to accommodate a laser lamp L;

two second fixers 40 locked on the two first fixers 20 so as to clamp the two lamp holders 30 respectively, each of the two second fixers 40 including a second arcuate portion 41, a second receiving orifice 42 passing through the second arcuate portion 41 upwardly, two symmetrical projections (i.e., a first projection 43 and a second projection 44) extending downward from a side of each second fixer 40, wherein the first projection 43 has a second threaded hole 430, and the second projection 44 has a third threaded hole 440;

the first rotation portion 33 being defined between the first projection 43 and the first protrusion 25, and the second rotation portion 34 being defined between the second projection 44 and the second protrusion 26;

two first resilient elements 50, each of the two first resilient elements 50 being accommodated in the limitation hole 24, wherein two first ends of the two first resilient element 50 abut against the two extensions 13, 14 respectively, and two second ends of the two first resilient elements 50 contact with two swing portions 35 of the two lamp holders 30 individually;

two first adjustable screws 51, each of the two first adjustable screws 51 including external threads corresponding to the first threaded hole 23, wherein each first adjustable screw 51 is inserted through the first threaded hole 23 to clamp the swing portion 35 of each lamp holder 30 with each first resilient element 50;

two second resilient elements 52, each of the two second resilient elements 52 being received in the first notch 250 of each first fixer 20, wherein a first end of each second resilient element 52 abuts against the first notch 250 of each first fixer 20, and a second end of each second resilient element 52 contacts with the first rotation portion 33 of each lamp holder 30;

two second adjustable screws 53, each of the two second adjustable screws 53 including external threads corresponding to the second threaded hole 430 of each second fixer 40, wherein each second adjustable screw 53 is inserted through the second threaded hole 430 to clamp the first rotation portion 33 of each lamp holder 30 with each second resilient element 52; and two protective cases 60 locked on the two second fixers 40 respectively.

Figure 7:
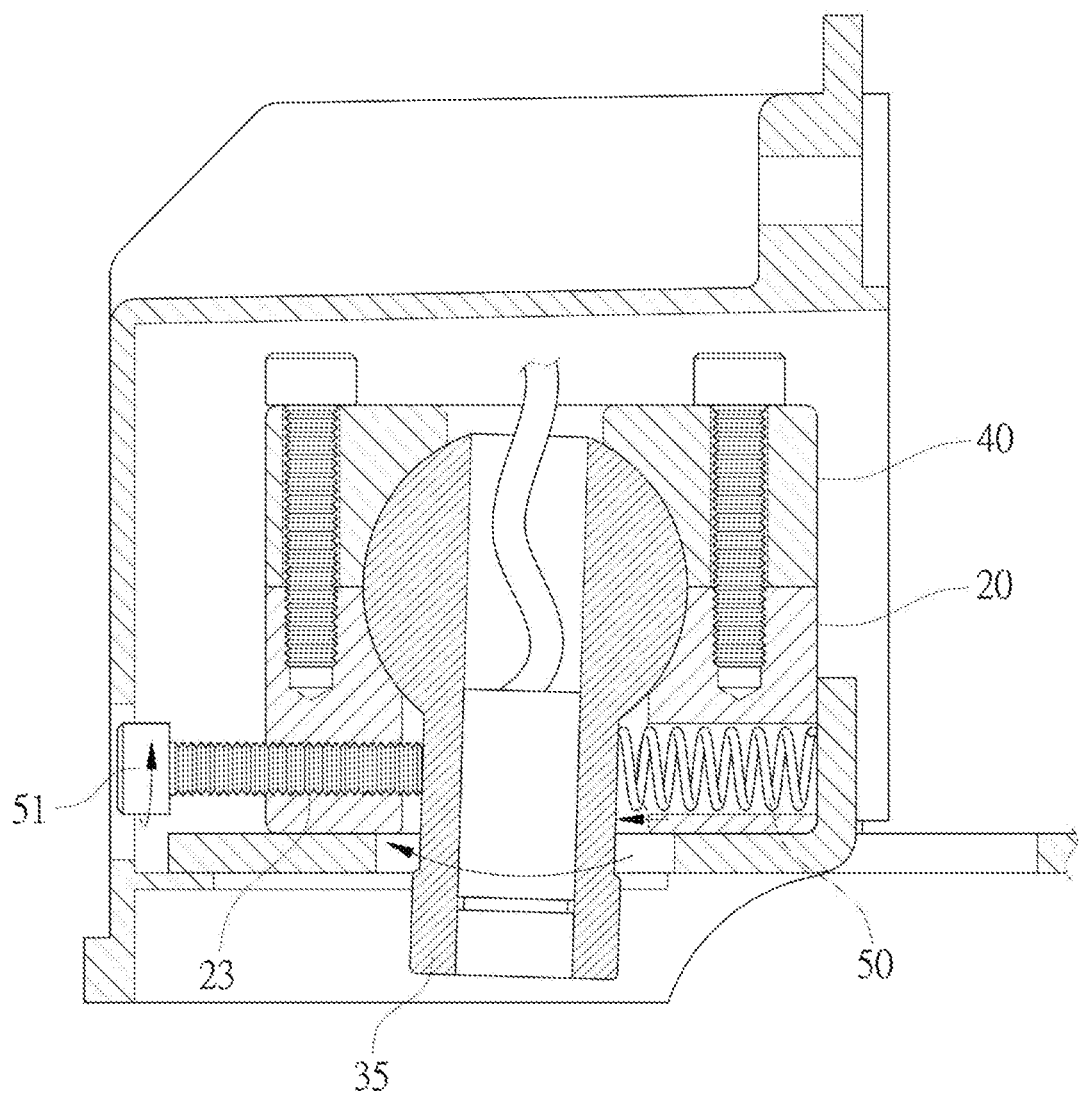
FIG. 7 is a cross sectional view showing the operation of one side of a laser alignment system according to the preferred embodiment of the present invention.

Referring to FIG. 7, when each first adjustable screw 51 is counterclockwise rotated to remove from the first threaded hole 23 slightly, each first resilient element 50 pushes the swing portion 35 of each lamp holder 30. When each first adjustable screw 51 is clockwise rotated to screw with the first threaded hole 23, it pushes the swing portion 35 so as to adjust a swing angle of the laser lamp L.

Figure 8:
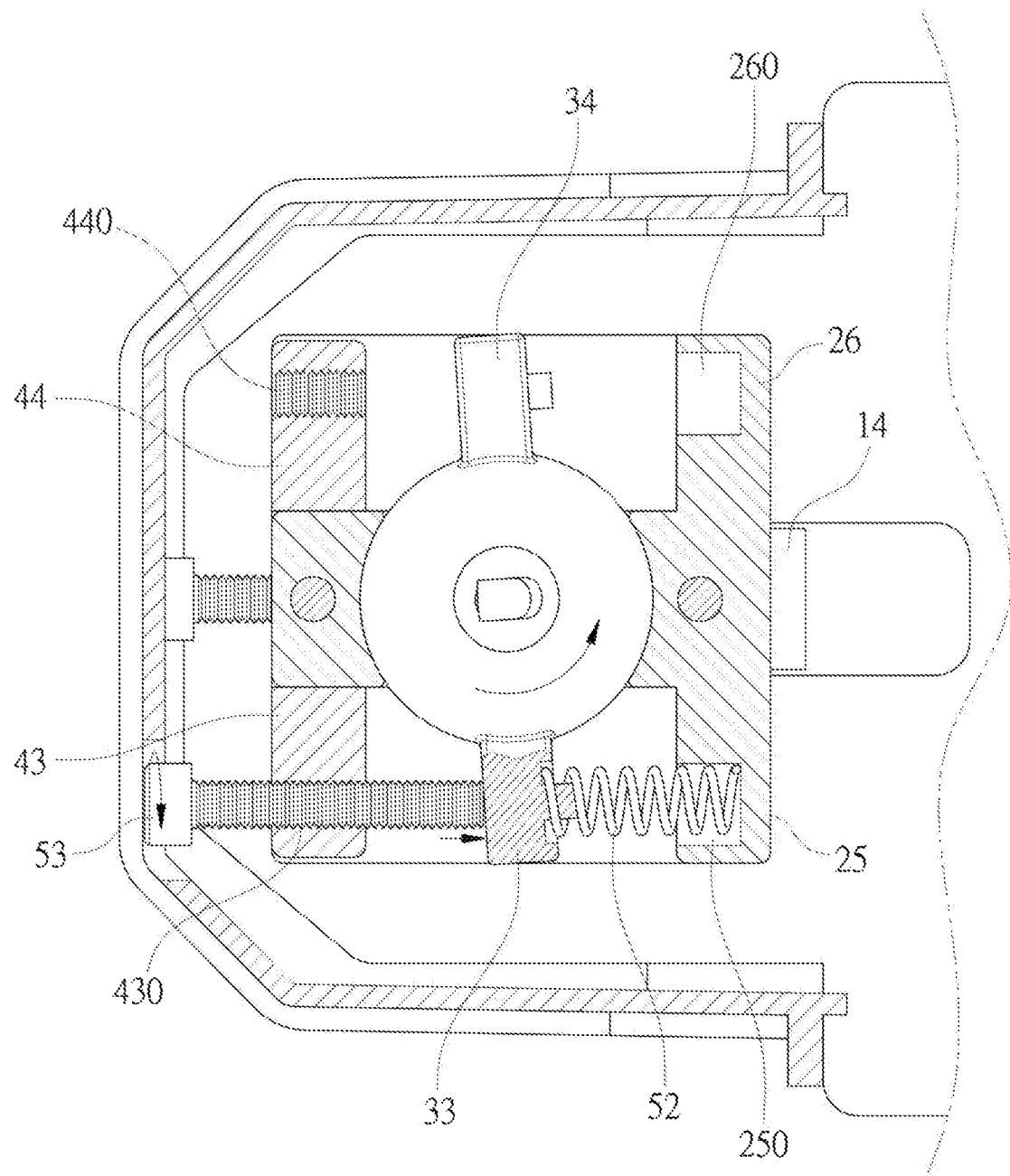
FIG. 8 is another cross sectional view showing the operation of one side of laser alignment system according to the preferred embodiment of the present invention.

As shown in FIG. 8, when each second adjustable screw 53 is counterclockwise rotated to remove from the second threaded hole 430 of each second fixer 40, each second resilient element 52 pushes the first rotation portion 33 of each lamp holder 30. When each second adjustable screw 53 is clockwise rotated to screw with the second threaded hole 430 of each second fixer 40, each second adjustable screw 53 pushes the first rotation portion 33 so as to adjust a swing angle of the laser lamp L.

Figure 9:
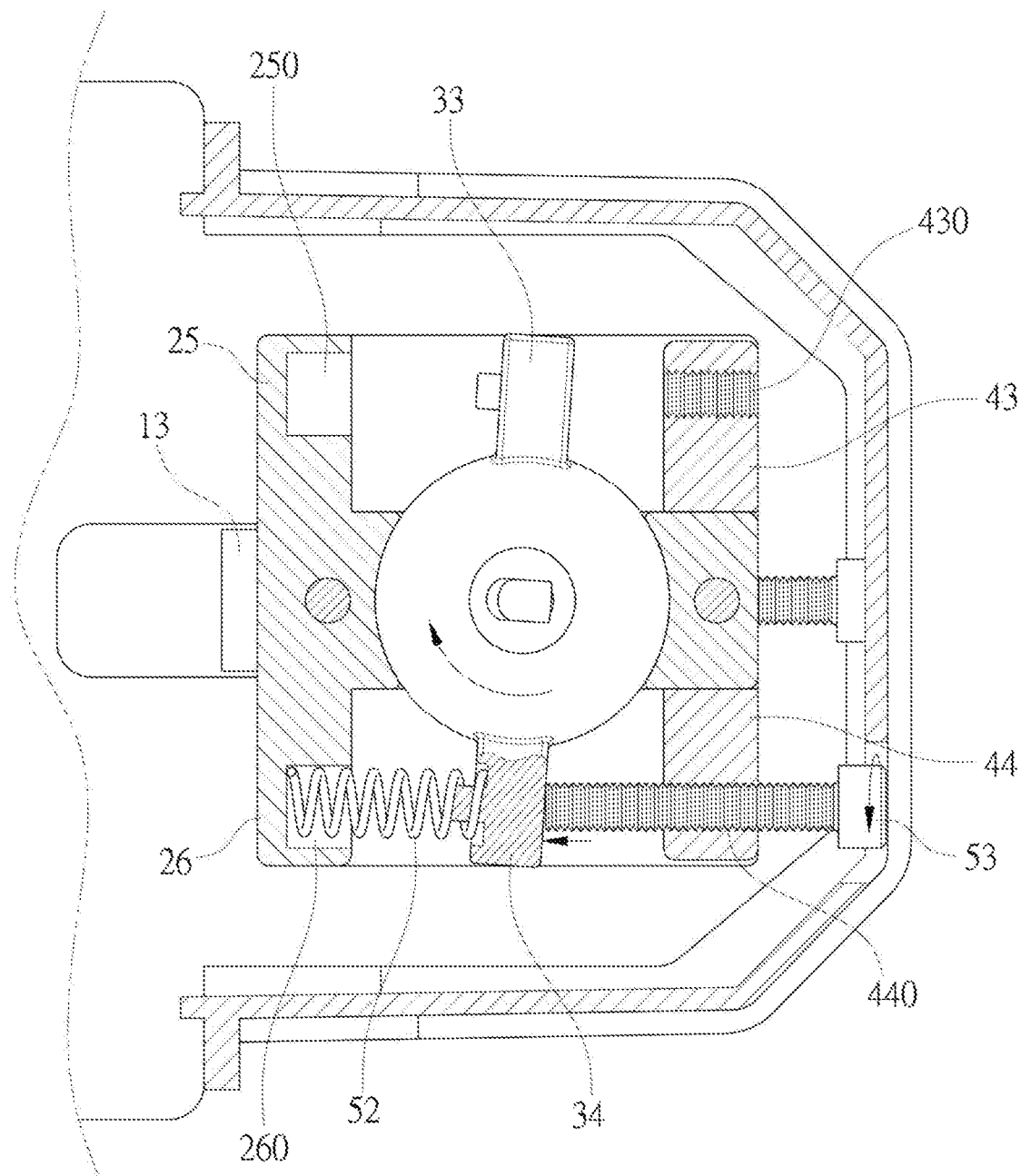
FIG. 9 is a cross sectional view showing the operation of the other side of a laser alignment system according to the preferred embodiment of the present invention.

As shown in FIG. 9, a laser alignment system comprises two symmetrical first fixers 20, two symmetrical lamp holders 30, and two symmetrical second fixers 40 which, wherein two second resilient elements 52 are accommodated in two second notches 260 of the two first fixers 20 respectively, wherein a first end of each of the two second resilient elements 52 abuts against each of the two second notches 260, and a second end of each second resilient element 52 contacts with the second rotation portion 34 of each lamp holder 30; wherein each second adjustable screw 53 is inserted through the second threaded hole 430 to clamp the second rotation portion 34 of each lamp holder 30 with each second resilient element 52.

When one side of the laser alignment system is arranged on a left side of the drilling machine M, as illustrated in FIG. 8, each second resilient element 52 and each second adjustable screw 53 are accommodated in the first notch 250 of each first fixer 20 and the second threaded hole 430 of each second fixer 40 respectively. When the other side of the laser alignment system is arranged on a right side of the laser device, as shown in FIG. 9, each second resilient element 52 and each second adjustable screw 53 are accommodated in the second notch 260 of each first fixer 20 and the third threaded hole 440 of each second fixer 40 respectively.

Thereby, the laser alignment system of the present invention has advantages as follows:

1. The peripheral knob 31, the first rotation portion 33, the second rotation portion 34, and the swing portion 35 of each lamp holder 30 are one-piece formed (i.e., injection molded by ways of a mold) so as to reduce manufacture cost.

2. The peripheral knob 31 is clamped by the second arcuate portion 41 of each second fixer 40 and the first arcuate portion 21 of each first fixer 20 so as to enhance a contacting area of the peripheral knob 31, the second arcuate portion 41, and the first arcuate portion 21, thus adjusting laser beams of the laser device securely.

3. The swing angle of the laser lamp L is increased so as to fix the laser device on the drilling machine easily.

4. The first protrusions 25 is symmetrical to the second protrusion 26, the first projection 43 is symmetrical to the second projection 44, and the second threaded hole 430 is symmetrical to the third threaded hole 440, so each second resilient element 52 is accommodated symmetrically to each second adjustable screw 53, thus adjustably positioning the laser beams of the laser lamp L, simplifying the laser device, and maintaining the laser lamp L easily.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:
1. A laser alignment system comprising:
a base (10) including two symmetrical holding sections (11), (12) formed on two ends of the base (10) respectively, two extensions (13), (14) extending from the two symmetrical holding sections (11), (12) respectively, and two peripheral orifices (15) formed on the two symmetrical holding sections (11), (12) individually;
two first fixers (20) abutting against the two extensions (13), (14) and provided on the two symmetrical holding sections (11), (12) individually, wherein each of the two first fixers (20) has a first arcuate portion (21), an accommodation hole (22) passing through the first arcuate portion (21) downwardly, a first threaded hole (23) horizontally passing through each of the first fixers (20), a limitation hole (24) horizontally passing through each of the first fixers (20), two symmetrical protrusions which are a first protrusion (25) and a second protrusion (26) and extend upward from a side of each of the first fixers (20), wherein the first protrusion (25) has a first notch (250), and the second protrusion (26) has a second notch (260), wherein the two peripheral orifices (15) are in communication with the accommodation hole (22), the first threaded hole (23), and the limitation hole (24);

two lamp holders (30), each of the two lamp holders (30) including a peripheral knob (31), a first receiving orifice (32), a first rotation portion (33), a second rotation portion (34), and a swing portion (35), wherein the second rotation portion (34) is opposite to the first rotation portion (33) so that each of the two lamp holders (30) is formed in a T shape, the swing portion (35) is inserted into the accommodation hole (22), the peripheral knob (31) is mounted on the first arcuate portion (21), and the swing portion (35) is hollow and is in communication with the first receiving orifice (32) so as to accommodate a laser lamp (L);

two second fixers (40) provided on the two first fixers (20) so as to clamp the two lamp holders (30) respectively, each of the two second fixers (40) including a second arcuate portion (41), a second receiving orifice (42) passing through the second arcuate portion (41) upwardly, two symmetrical projections which are a first projection (43) and a second projection (44) and extend downward from a side of each of the second fixers (40), wherein the first projection (43) has a second threaded hole (430), and the second projection (44) has a third threaded hole (440);

the first rotation portion (33) being defined between the first projection (43) and the first protrusion (25), and the second rotation portion (34) being defined between the second projection (44) and the second protrusion (26);

two first resilient elements (50), each of the two first resilient elements (50) being accommodated in the limitation hole (24), wherein two first ends of the two first resilient element (50) abut against the two extensions (13), (14) respectively, and two second ends of the two first resilient elements (50) contact with the two swing portions (35) of the two lamp holders (30) individually;

two first adjustable screws (51), each of the two first adjustable screws (51) including external threads, wherein each of the two first adjustable screws (51) is inserted through the first threaded hole (23) to clamp the swing portion (35) of each of the two lamp holders (30) with each of the first resilient elements (50);

two second resilient elements (52), each of the two second resilient elements (52) being received in the first notch (250) of each of the first fixers (20), wherein a first end of each of the second resilient elements (52) abuts against the first notch (250) of each of the first fixers (20), and a second end of each of the second resilient elements (52) contacts with the first rotation portion (33) of each of the two lamp holders (30); and two second adjustable screws (53), each of the two second adjustable screws (53) including external threads, wherein each of the two second adjustable screws (53) is inserted through the second threaded hole (430) to clamp the first rotation portion (33) of each of the two lamp holders (30) with each of the second resilient elements (52).

2. The laser alignment system as claimed in claim 1, wherein each of the second resilient elements (52) is accommodated in the second notch (260) of each of the first fixers (20), wherein each of the second adjustable screws (53) is inserted through the second threaded hole (430) to clamp the second rotation portion (34) of each of the two lamp holders (30) with each of the second resilient elements (52).

3. A drilling machine comprising:

a laser alignment system of claim 2 being affixed to the drilling machine;

wherein a central orifice (16) is defined on a center of the base (10) so as to accommodate a drill head of the drilling machine, and multiple passing orifices (17) surrounding the central orifice (16) and configured to lock the base (10) on the drilling machine (M);

wherein one side of the laser alignment system is arranged on a left side of the drilling machine (M), each of the two second resilient elements (52) and each of the two second adjustable screws (53) are accommodated in the first notch (250) of each of the first fixers (20) and the second threaded hole (430) of each of the second fixers (40) respectively, and each of the two second resilient elements (52) and each of the two second adjustable screws (53) clamp the first rotation portion (33); when the other side of the laser alignment system is arranged on a right side of the drilling machine (M), each of the two second resilient elements (52) and each of the second adjustable screws (53) are accommodated in the second notch (260) of each of the two first fixers (20) and the third threaded hole (440) of each of the second fixers (40) respectively, and each of the two second resilient elements (52) and each of the two second adjustable screws (53) clamp the second rotation portion (34).

* * * * *